United States Patent
Gunther et al.

(10) Patent No.: US 9,550,316 B2
(45) Date of Patent: Jan. 24, 2017

(54) NOZZLE MOUTHPIECE FOR AN INJECTION MOLDING NOZZLE, INJECTION MOLDING NOZZLE AND INJECTION MOLDING TOOL

(71) Applicant: GUNTHER Heisskanaltechnik GmbH, Frankenberg (DE)

(72) Inventors: Herbert Gunther, Allendorf (DE); Siegrid Sommer, Burgwald (DE)

(73) Assignee: GÜNTHER Heisskanaltechnik GmbH, Frankenberg (DE)

( * ) Notice: Subject to any disclaimer, the term of this patent is extended or adjusted under 35 U.S.C. 154(b) by 221 days.

(21) Appl. No.: 13/895,507

(22) Filed: May 16, 2013

(65) Prior Publication Data

US 2013/0309348 A1   Nov. 21, 2013

(30) Foreign Application Priority Data

May 16, 2012  (DE) .................. 10 2012 104 291

(51) Int. Cl.
| | |
|---|---|
| *B29C 49/00* | (2006.01) |
| *B29C 45/20* | (2006.01) |
| *B29C 45/27* | (2006.01) |
| *B29C 45/28* | (2006.01) |

(52) U.S. Cl.
CPC ............ *B29C 45/20* (2013.01); *B29C 45/278* (2013.01); *B29C 45/2806* (2013.01); *B29C 2045/2796* (2013.01); *B29C 2045/2798* (2013.01)

(58) Field of Classification Search
CPC ............................... B29C 45/20; B29C 45/278
USPC ........................................................ 425/549
See application file for complete search history.

(56) References Cited

U.S. PATENT DOCUMENTS

| | | | | |
|---|---|---|---|---|
| 5,879,727 | A  * | 3/1999 | Puri .............................. | 425/549 |
| 2004/0197437 | A1* | 10/2004 | Olaru ........................... | 425/549 |
| 2008/0226764 | A1 | 9/2008 | Gunther et al. | |

FOREIGN PATENT DOCUMENTS

| | | |
|---|---|---|
| DE | 16 29 704 | 2/1971 |
| DE | 20 44 583 | 3/1972 |
| DE | 3249486 | 6/1984 |
| DE | 3403603 | 8/1985 |
| JP | 2008-229963 | 10/2008 |
| WO | 2005/018906 | 3/2005 |

* cited by examiner

*Primary Examiner* — Joseph S. Del Sole
*Assistant Examiner* — John Robitaille
(74) *Attorney, Agent, or Firm* — Clark & Brody (57) ABSTRACT

A nozzle mouthpiece for an injection molding nozzle for use in an injection molding tool and for processing a fluid mass has a flow channel having an inlet opening and an outlet opening. A first sealing surface is formed radially with respect to a longitudinal axis. A stop surface is arranged between the first sealing surface and the outlet opening and is aligned perpendicular to the longitudinal axis and facing the outlet opening. A a coupling means is arranged radially with respect to the longitudinal axis for fixing the nozzle mouthpiece in a mold sprue opening of a pattern plate. An injection molding nozzle and an injection molding tool is provided having such the telescopic nozzle mouthpiece, which can be fixed in a mold sprue opening of a pattern plate.

13 Claims, 4 Drawing Sheets

NOZZLE MOUTHPIECE FOR AN INJECTION MOLDING NOZZLE, INJECTION MOLDING NOZZLE AND INJECTION MOLDING TOOL

The invention relates to a nozzle mouthpiece for an injection molding nozzle as claimed in the pre-characterizing clause of claim 1, an injection molding nozzle having such a nozzle mouthpiece as claimed in claim 8, and an injection molding tool as claimed in claim 9.

Injection molding nozzles, in particular hot or cold-channel nozzles, are normally used in order to feed a fluid material, in particular a melt, to a separable tool block made of pattern plates. These usually have a temperature-controlled nozzle body in which a flow or melt channel is formed which opens out at or in a nozzle mouthpiece and is flow-connected to a mold cavity of the injection molding tool which is formed by the pattern plates. In order for the melt to be maintained at a uniform temperature up to the mold cavity, the nozzle mouthpiece, which is introduced to the nozzle body from below, is made of a highly heat-conducting material. In addition, an air gap is formed between the injection molding nozzle and the tool for the purpose of thermal isolation.

A disadvantage here is that, due to the usually fixed connection between nozzle body and nozzle mouthpiece, linear thermal expansion causes a displacement of the nozzle mouthpiece relative to the sprue opening. Component faults accordingly occur at the sprue point. In addition, a seal between the injection molding nozzle and the mold sprue opening can fail, enabling melt to escape and the injection molding tool to be damaged.

The same problem occurs with needle valve nozzles. Shut-off needles are axially movably mounted in the needle valve nozzle (see, for example, DE 3249486 C3 or DE 3403603 A1). A melt channel which runs through a nozzle body usually ends in a nozzle mouthpiece which forms the outlet opening for the melt at the end thereof. In the closed position, the bottom end of the shut-off needle, which is usually cylindrical in cross section, engages in a likewise cylindrical sealing seat which is formed in the nozzle mouthpiece. Shut-off needles are predominantly pneumatically or hydraulically driven and are periodically moved from an open to a closed position. When doing so, an accurate as possible guidance of the needle is necessary in order to avoid damage to the nozzle mouthpiece and to the tool.

In order to reduce the sealing problems between nozzle mouthpiece and pattern plate which also occur here, WO 2005 018 906 A1 for example provides an injection molding nozzle for use in an injection molding tool which has a nozzle body with at least one flow channel for an injection molding compound to be processed. The flow channel opens out at or in a nozzle mouthpiece and is flow-connected to a mold cavity of the injection molding tool. The nozzle mouthpiece, which is arranged in the nozzle body, is designed to be moved in a longitudinal direction and is clamped between the nozzle body and a pattern plate of the injection molding tool while the injection molding nozzle is in operation. A problem here, however, is the non-constant contact force between the nozzle mouthpiece and the pattern plate. In addition, the nozzle mouthpiece can be moved back in the longitudinal direction during operation due to the injection forces. This can give rise to leaks. Furthermore, the nozzle mouthpiece can fall out of the nozzle body during assembly.

It is an important objective of the invention to overcome this and further disadvantages of the prior art and to create a nozzle mouthpiece for an injection molding nozzle and for use in an injection molding tool which is assembled cost-effectively with simple means and enables the nozzle mouthpiece to be changed easily as well as quickly. In doing so, adverse effects of the temperature distribution and effects of thermal expansion are to be eliminated as far as possible. In addition, in the embodiment of the injection molding nozzle in the form of a needle valve nozzle, a precise needle guidance and sealing, which guarantees reliable operation at all times even under high alternating loads, is to be achieved in the long term.

The main features of the invention are specified in the characterizing part of claim 1 and claims 8 and 9. Embodiments are the subject matter of claims 2 to 8 and 10 to 12.

The invention relates to a nozzle mouthpiece for an injection molding nozzle for use in an injection molding tool and for processing a fluid mass, comprising a flow channel having an inlet opening and an outlet opening, a first sealing surface which is formed radially with respect to a longitudinal axis, a stop surface which is arranged between the first sealing surface and the outlet opening and which is aligned perpendicular to the longitudinal axis and facing the outlet opening, and a coupling means which is arranged radially with respect to the longitudinal axis for fixing the nozzle mouthpiece in a mold sprue opening of a pattern plate.

Such a nozzle mouthpiece can therefore be accurately fixed relative to the pattern plate in the region of a sprue opening provided there. As a result of the coupling means, the nozzle mouthpiece has a defined position in all operating states of the injection molding tool and the quality of the injection points is high. Furthermore, the contact force between the nozzle mouthpiece and the pattern plate is substantially constant. Consequently, a seal is reliably formed between the nozzle mouthpiece and the pattern plate. However, linear thermal expansion can be compensated for by an ability to telescope along the first cylindrical sealing surface. Preferably, the coupling means is arranged between the stop surface and the outlet opening.

In a development of the invention, the coupling means is an external thread. Threads can be produced cost effectively with established tools. In addition, the contact force between the nozzle mouthpiece and the pattern plate can be accurately adjusted by screwing in with defined torque. Coupling by means of a thread enables the nozzle mouthpiece to be easily replaced after removing the rest of the injection molding nozzle. In addition, a thread can be used repeatedly. At the same time, the diameter of the coupling means, here the external thread, which is aligned radially with the longitudinal axis should be greater than the maximum diameter of the nozzle mouthpiece which is aligned radially with the longitudinal axis in the direction of the outlet opening-starting from the coupling means.

A coupling means in the form of a bayonet connector or bayonet means can also be used as an alternative to the external thread. Here, the contact force is defined solely by the end position achieved, thus avoiding errors in assembly. Furthermore, the coupling means can conceivably be in the form of a retaining flange. This can be formed by a flange which projects radially with respect to the longitudinal axis beyond the first sealing surface. Such a flange can also form the stop surface. For this purpose, the diameter of the coupling means which is aligned radially with the longitudinal axis is preferably less than the diameter of the flange which is aligned radially with the longitudinal axis. Furthermore, the flange preferably forms a tool mounting so that the coupling means can be easily actuated.

The first sealing surface should be positioned coaxially with respect to the longitudinal axis in order to make the nozzle mouthpiece as slim as possible and therefore suitable for closely spaced sprue openings and also to achieve a centering means, enabling the nozzle body or the material tube to be slid on easily. In a preferred embodiment of the invention, the first sealing surface is arranged radially on the outside for this purpose. To enable a telescopic mounting on/in the nozzle body or material tube, the diameter of the first sealing surface which is aligned radially with the longitudinal axis is preferably greater than or equal to the maximum diameter of the nozzle mouthpiece which is aligned radially with the longitudinal axis in the direction of the inlet opening-starting from the first sealing surface. Alternatively however, the first sealing surface can also be arranged radially on the inside.

From similar considerations, the external thread should also be positioned coaxially with respect to the longitudinal axis. Typically, the flow channel is substantially formed so that it widens from the outlet opening towards the inlet opening. The inlet opening and the outlet opening can lie on the longitudinal axis and preferably be positioned coaxially with respect to the longitudinal axis.

In particular, however, the inlet opening can also be arranged radially with respect to the longitudinal axis in the first sealing surface. In particular, this enables shut-off needles to be arranged substantially outside the melt channel.

An exact positioning of the nozzle mouthpiece relative to the mold sprue opening is particularly successful when the stop surface is aligned perpendicular to the longitudinal axis. To ensure that the nozzle mouthpiece cannot be pushed further into the nozzle body or material tube than required, a second stop surface is preferably provided perpendicular to the longitudinal axis and pointing in the direction of the inlet opening. This in turn should be aligned perpendicular to the longitudinal axis.

In spite of the easy replacability of the nozzle mouthpiece, a development of the invention provides that this be made of a wear-resistant material. The maintenance intervals are correspondingly long. Furthermore, the nozzle mouthpiece is preferably made of a highly heat-conducting material in order to be able to accurately control the temperature of a molten mass flowing through it.

According to an advantageous embodiment, an external second sealing surface aligned radially with the longitudinal axis is formed between the coupling means and the outlet opening. The seal between injection molding nozzle and pattern plate is therefore positioned very close to the mold cavity. In addition, the coupling means lies on the sealed-off side of the seal and is not flooded by melt. Accordingly, the coupling means can also be easily actuated after numerous injection cycles.

Preferably, the second sealing surface forms a radial centering means for the nozzle mouthpiece, in particular for its first sealing surface. This enables the nozzle body or the material tube to be placed easily on the fixed nozzle mouthpiece. The second sealing surface is preferably positioned coaxially with respect to the longitudinal axis for this purpose. In addition, the second sealing surface should be formed cylindrically or tapering narrowing in the direction of the outlet opening around the longitudinal axis in order to ensure centering at all times. The diameter of the coupling means which is aligned radially with the longitudinal axis must then be chosen to be greater than the diameter of the second sealing surface which is aligned radially with the longitudinal axis.

In a preferred variant of the invention, the outlet opening is encompassed radially with respect to the longitudinal axis by a face surface of the mold which borders a region of a mold cavity in a formative manner in an assembly position. By fixing the nozzle mouthpiece to the pattern plate close to the mold cavity, there is virtually no longer any offset between the formative surface of the pattern plate and the mold surface of the nozzle mouthpiece. At the same time, the nozzle mouthpiece can be manufactured with high precision and thus enables qualitative injection points with a defined surface in the region of the mold surface. In doing so, the mold surface of the nozzle mouthpiece can be spherical in shape, as a result of which the behavior of the inflowing molten mass can be optimized. In order to minimize a visible edge and thickening of the material, the mold surface preferably borders the second sealing surface.

In a special version of the nozzle mouthpiece according to the invention, a needle sealing surface for a shut-off needle, which is aligned radially with the longitudinal axis, is formed in the flow channel. The nozzle mouthpiece is therefore also suitable for needle valve nozzles. The needle sealing surface is preferably formed cylindrically around the longitudinal axis and preferably positioned coaxially with respect to the longitudinal axis. Needle guide elements should be arranged in the flow channel of the nozzle mouthpiece for accurate guidance of the needle sealing surface. An alignment of the needle guide elements along the longitudinal axis and a rib-shaped design are favored here.

According to another special version of the nozzle mouthpiece according to the invention, this forms an open sprue. Such a nozzle mouthpiece is therefore suitable for injection molding nozzles without shut-off needles, and in particular for open sprue points, i.e. open outlet openings. To optimize the melt flow and the temperature control of the molten mass, the nozzle mouthpiece can then have or form a tapering nozzle tip which projects to or beyond the outlet opening.

Furthermore, the invention relates to an injection molding nozzle for use in an injection molding tool and for processing a fluid mass having a nozzle body in which at least one flow channel having a channel inlet and a channel outlet for the fluid mass is formed, wherein the channel outlet of the flow channel opens out into an inlet opening of a nozzle mouthpiece as described above, wherein the nozzle body forms a cylindrical sealing surface which is aligned radially with the longitudinal axis in the region of the channel outlet, and wherein the first sealing surface of the nozzle mouthpiece is mounted movably in the direction of the longitudinal axis on the sealing surface of the nozzle body to form a seal.

Such an injection molding nozzle can be fixed with the inlet side to a machine nozzle or to a manifold. At the same time, the nozzle mouthpiece can be fixed to a pattern plate by means of its coupling means. Linear thermal expansion in the longitudinal direction is compensated for by means of the ability to telescope. The nozzle mouthpiece remains correctly positioned with respect to the pattern plate at all times, and the seal between the nozzle mouthpiece and the pattern plate works reliably. Here, the injection molding nozzle can be in the form of a hot-channel nozzle or a cold-channel nozzle, wherein, however, the advantages of the invention are brought to bear particularly with hot-channel nozzles which are subject to severe thermal stress. For use as a hot-channel nozzle, a heating device, which is preferably controlled by a measuring and control unit with corresponding thermocouples, should be arranged on the nozzle body.

Preferably, the nozzle body forms a stop surface on sides of the channel outlet. This stop surface should be aligned perpendicular to the longitudinal axis and correspond with a stop surface of the nozzle mouthpiece. Accordingly, the nozzle mouthpiece cannot be pushed further than is allowed in the direction of the nozzle body.

In a special variant of the injection molding nozzle, a needle sealing surface, which corresponds with a shut-off needle of the injection molding nozzle to form a seal in a closed position of the injection molding nozzle and is aligned radially with the longitudinal axis, is formed in the flow channel of the nozzle mouthpiece. Here, the shut-off needle is preferably mounted movably along the longitudinal axis coaxially with respect to the longitudinal axis.

In order to thermally decouple the nozzle mouthpiece from cooler components, a development of the invention provides that the nozzle mouthpiece is at least partially radially encompassed by a sleeve made from a poor thermally conducting material between the coupling means and the inlet opening. In addition, the sleeve should border an air gap which likewise provides thermal insulation.

Further, the invention relates to an injection molding tool for processing a fluid mass having an injection molding nozzle as described above and a pattern plate which forms a mold cavity into which a mold sprue opening opens out, wherein the outlet opening of the nozzle mouthpiece is fed into the mold sprue opening, and wherein the mold sprue opening has a coupling means which engages with the coupling means of the nozzle mouthpiece. It is advantageous here that, by means of the coupling means, the nozzle mouthpiece has a defined and substantially fixed position relative to the mold sprue opening. This enables the advantages of the injection molding nozzle and the nozzle mouthpiece described above to be realized.

According to the embodiment of the coupling means of the nozzle mouthpiece, the coupling means of the mold sprue opening should be an internal thread which is aligned radially with the longitudinal axis or a bayonet means or a hold-down device for a retaining flange. At the opposite end, the nozzle body can be arranged on and/or fixed to a material feeder by means of the channel inlet of the flow channel. A machine nozzle and a manifold are both suitable material feeders.

In a development of the injection molding tool, the outlet opening of the nozzle mouthpiece is encompassed radially with respect to the longitudinal axis by a face surface of the mold which borders a region of the mold cavity in a formative manner. In this way, high-quality injection points are achieved. For this purpose, the mold surface and a mold cavity wall of the mold cavity preferably finish flush.

The flush finish can be easily achieved particularly with a development of the injection molding tool in which the stop surface of the nozzle mouthpiece rests against a stop surface of the mold sprue opening which radially encompasses the mold sprue opening.

In a particular embodiment of the injection molding tool, it is provided that the nozzle mouthpiece has an external second sealing surface which is aligned radially with the longitudinal axis between its coupling means and the outlet opening, and that the mold sprue opening has an internal sealing surface which is aligned radially with the longitudinal axis between its coupling means and the mold cavity, wherein the second sealing surface of the nozzle mouthpiece and the internal sealing surface of the mold sprue opening rest against one another to form a seal. Accordingly, the coupling means lie outside the fluid mass and therefore remain operable.

Preferably, the second sealing surface of the nozzle mouthpiece and the internal sealing surface of the mold sprue opening are both formed cylindrically around the longitudinal axis or both formed tapering narrowing in the direction of the mold cavity around the longitudinal axis. A slimmest possible embodiment and a centering means are achieved particularly when the second sealing surface and the internal sealing surface of the mold sprue opening are positioned coaxially with respect to the longitudinal axis Further characteristics, details and advantages of the invention can be seen from the wording of the claims and from the following description of exemplary embodiments with reference to the drawings. In the drawings:

Figure 1:
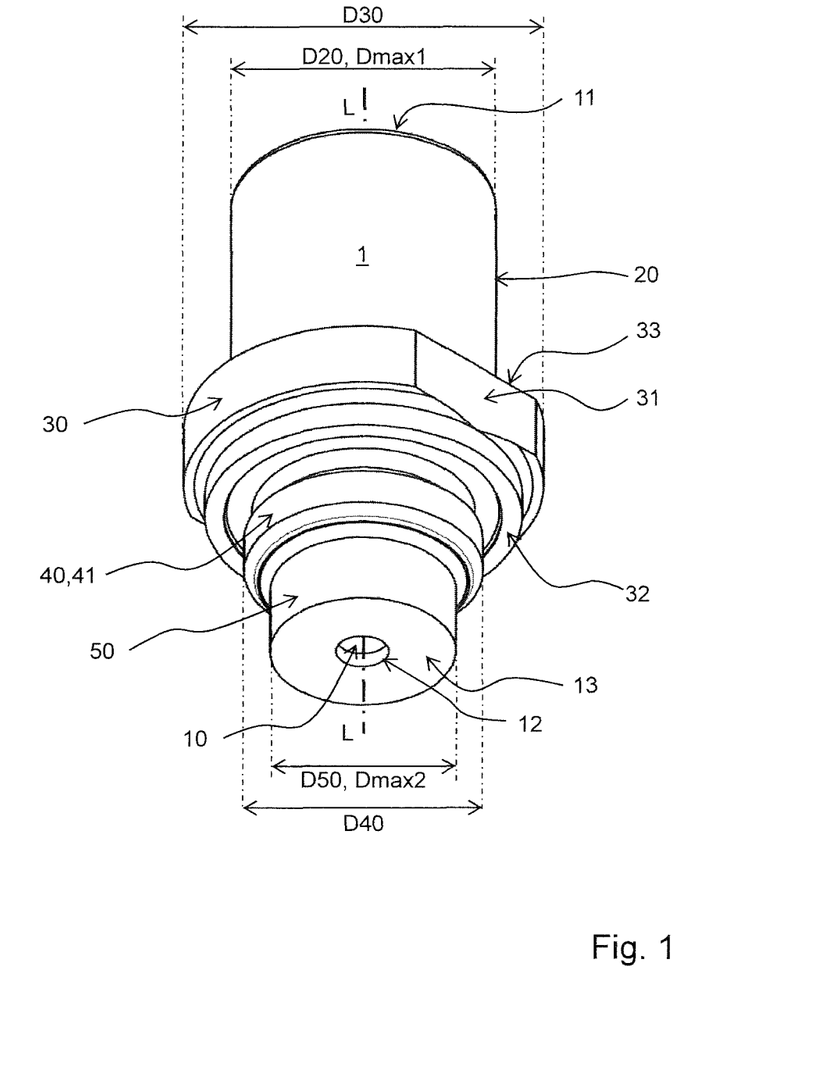
FIG. 1 shows a 3D view of a nozzle mouthpiece.

FIG. 1 shows a 3D view of a nozzle mouthpiece 1 for an injection molding nozzle 100 for use in an injection molding tool 200 and for processing a fluid mass M. The nozzle mouthpiece 1 is made of a wear-resistant and highly heat-conducting material. It has a flow channel 10 with an inlet opening 11 (hidden) and an outlet opening 12. The inlet opening 11 and the outlet opening 12 lie coaxially on a longitudinal axis L. The flow channel 10 is formed so that it widens from the outlet opening 12 towards the inlet opening 11.

A cylindrical first sealing surface 20 with a diameter D20 is formed radially and coaxially with respect to the longitudinal axis L. In doing so, the first sealing surface 20 is arranged radially on the outside. The diameter D20 of the first sealing surface 20 which is aligned radially with the longitudinal axis L corresponds to the maximum diameter Dmax1 of the nozzle mouthpiece 1 which is aligned radially with the longitudinal axis L in the direction of the inlet opening 11.

A stop surface 32, which is aligned perpendicular to the longitudinal axis L and facing the outlet opening 12, is arranged between the first sealing surface 20 and the stop surface 12. In particular, the stop surface 32 is aligned perpendicular to the longitudinal axis L. As can be seen, the stop surface 32 is formed by a flange 30 which projects radially with respect to the longitudinal axis L beyond the first sealing surface 20.

The flange 30 also forms a second stop surface 33 perpendicular to the longitudinal axis L and facing the inlet opening 11. This is also aligned perpendicular to the longitudinal axis L. Furthermore, the flange 30 acts as a tool mounting 31, in particular by means of the provided flattened side surfaces.

The nozzle mouthpiece 1 also includes a coupling means 40 which is arranged radially with respect to the longitudinal axis L for fixing the nozzle mouthpiece 1 in a mold sprue opening 202 (not shown here) of a pattern plate 201 (not shown here). In particular, the coupling means 40 is an external thread 41 which is positioned coaxially with respect to the longitudinal axis L. The coupling means 40 or the external thread 41 is arranged between the stop surface 32 and the outlet opening 12. The diameter D40 of the coupling means 40 which is aligned radially with the longitudinal axis L is less than the diameter D30 of the flange 30 which is aligned radially with the longitudinal axis L. In addition, the diameter D40 of the coupling means 40 is greater than the maximum diameter Dmax2 of the nozzle mouthpiece 1 which is aligned radially with the longitudinal axis L in the direction of the outlet opening 12.

An external, cylindrical second sealing surface 50, which is aligned radially and coaxially with the longitudinal axis L, is formed between the coupling means 40 and the outlet opening 12. This enables the second sealing surface 50 to be also used as a radial centering means. The diameter D40 of the coupling means 40 is greater than the diameter D50 of the second sealing surface 50 which is aligned radially with the longitudinal axis L.

The outlet opening 12 of the nozzle mouthpiece 1 is encompassed radially with respect to the longitudinal axis A by a face surface 13 of the mold which borders a region of a mold cavity 203 (not shown here) in a formative manner in an assembly position. In doing so, the mold surface 13 borders the second sealing surface 50.

Figure 2:
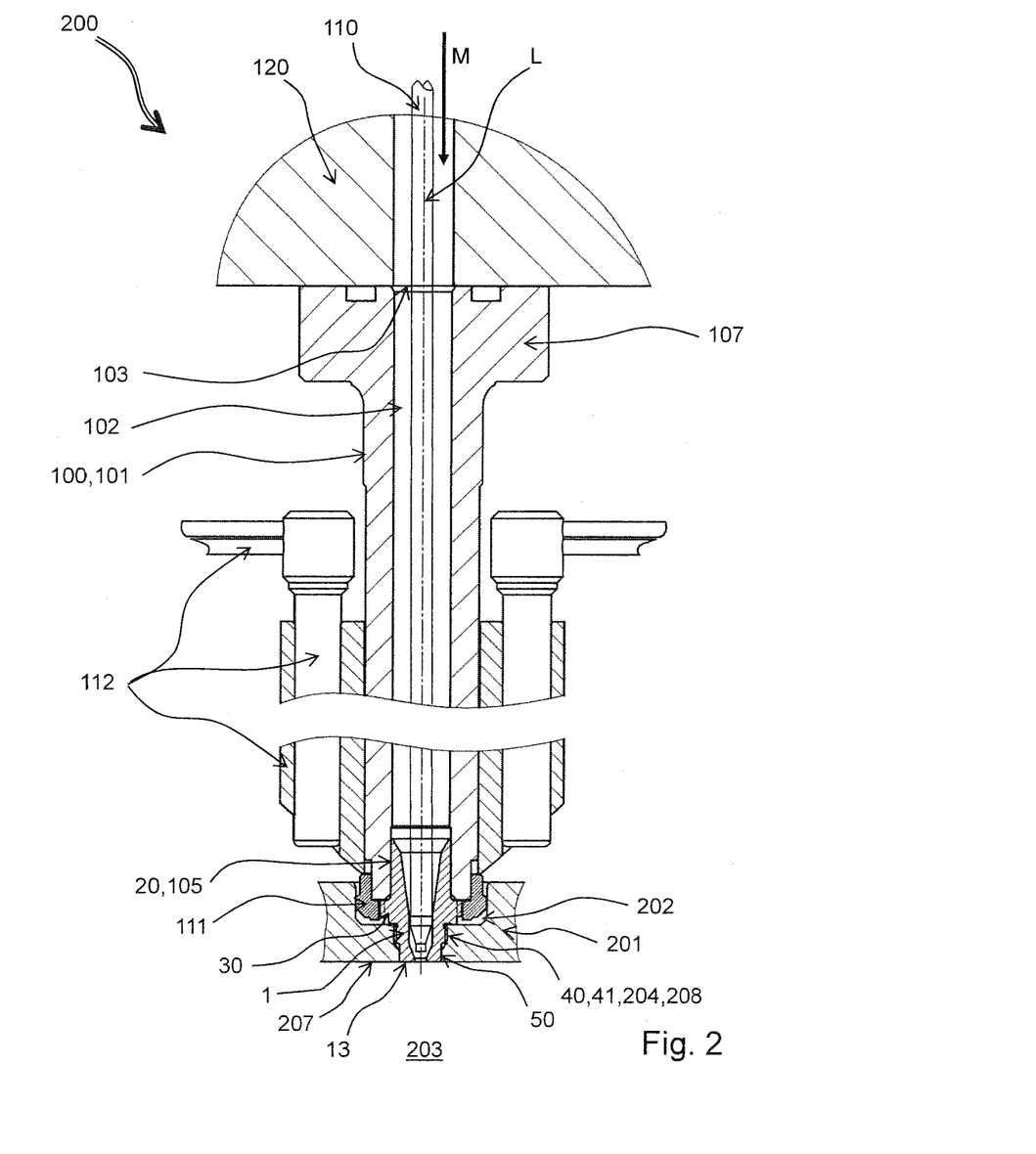
FIG. 2 shows a longitudinal section through a section of an injection molding tool comprising an injection molding nozzle with a shut-off needle and a nozzle mouthpiece.

A longitudinal section through a section of an injection molding tool 200 for processing a fluid mass M comprising an injection molding nozzle 100 with a shut-off needle 110 and a nozzle mouthpiece 1 according to an embodiment of FIG. 1 can be seen in FIG. 2. The nozzle mouthpiece from FIG. 2 can again be seen in a detailed view in FIG. 3. As can be seen in particular in FIG. 3, a cylindrical needle sealing surface 14 for a shut-off needle 110 which is aligned radially and coaxially with the longitudinal axis L is formed in the flow channel 10 of the nozzle mouthpiece 1. Needle guide elements which are arranged in the flow channel 10 cannot be seen however.

The injection molding nozzle 100 shown in FIG. 2 has a nozzle body 101 in which a flow channel 102 with a channel inlet 103 and a channel outlet 104 (see FIG. 3) for the fluid mass M is formed. The channel inlet 103 and the channel outlet 104 lie coaxially on the longitudinal axis L which corresponds with the longitudinal axis L of the nozzle mouthpiece 1. The flow channel 102 also runs along the longitudinal axis L, in particular coaxially therewith. The channel outlet 104 of the flow channel 102 opens out into the inlet opening 11 of the nozzle mouthpiece 1. In the region of the channel outlet 104, the nozzle body 101 forms a cylindrical and internal sealing surface 105 which is aligned radially and coaxially with the longitudinal axis L. The first sealing surface 20 of the nozzle mouthpiece 1 is mounted movably in the direction of the longitudinal axis L on the sealing surface 105 of the nozzle body 101 to form a seal.

The nozzle body 101 also forms a stop surface 106, which is aligned perpendicular to the longitudinal axis L and corresponds with the stop surface 32 of the nozzle mouthpiece 1, on sides of the channel output 104.

The shut-off needle 110 extends along the longitudinal axis L, in particular coaxially therewith, through the flow channel 102 of the nozzle body 101 and into the flow channel 10 of the nozzle mouthpiece 1. At the same time, it is mounted movably along the longitudinal axis L. In a closed position (not shown) of the injection molding nozzle 100, the shut-off needle 110 rests on the needle sealing surface 14 to form a seal.

The nozzle mouthpiece 1 is radially partially encompassed by a sleeve 111 made from a poor heat-conducting material between the external thread 41 and the inlet opening 11. In addition, the sleeve 111 borders an air gap S. Here, the sleeve 111 is supported by the nozzle body 101 but not by the nozzle mouthpiece 1.

Figure 3:
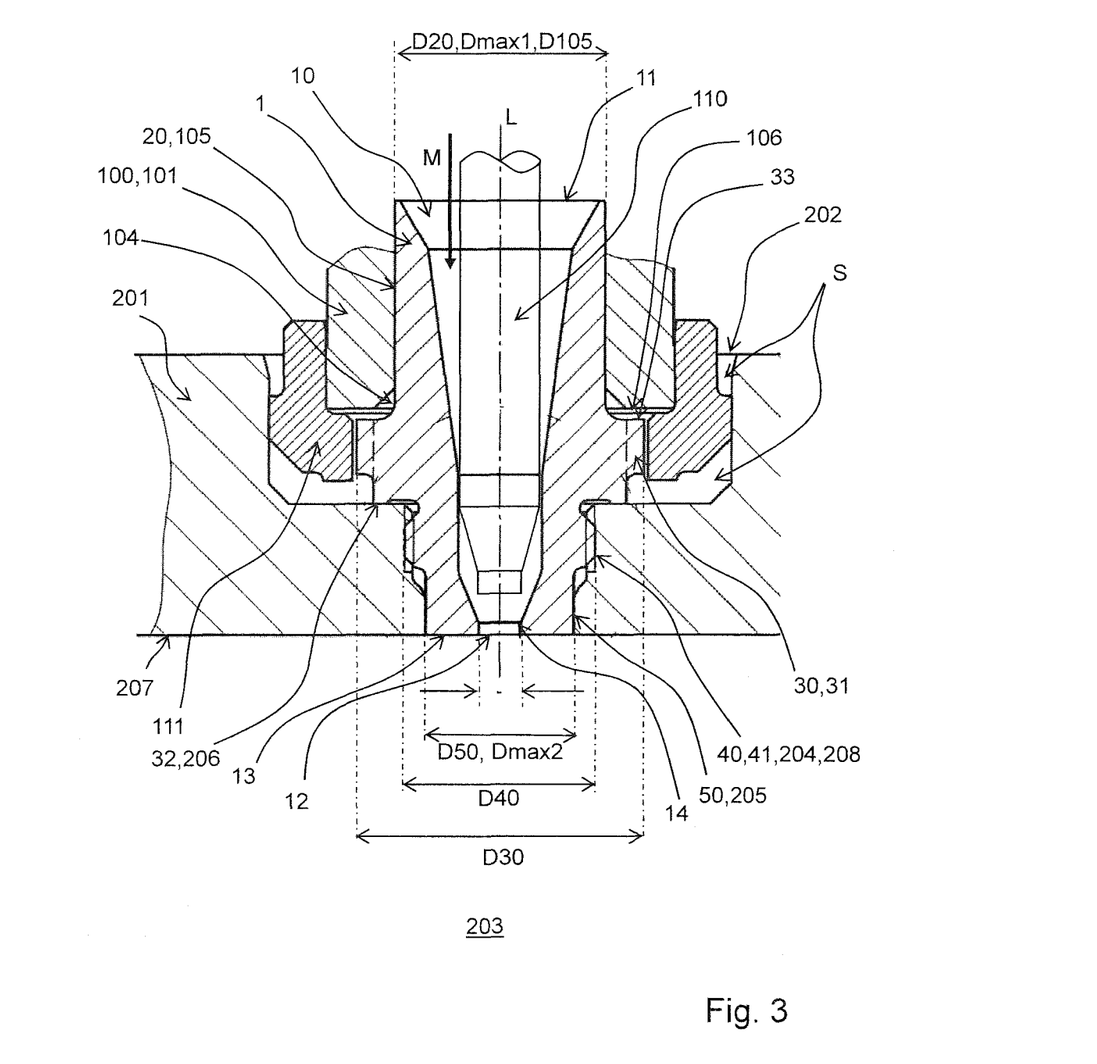
FIG. 3 shows a detailed view of the nozzle mouthpiece in FIG. 2.

As well as the injection molding nozzle 100, the injection molding tool 200 comprises a pattern plate 201 which forms a mold cavity 203 (position only indicated) into which a mold sprue opening 202 opens out (can be seen in FIGS. 2 and 3). The outlet opening 12 of the nozzle mouthpiece 1 is fed into the mold sprue opening 202. At the same time, the mold sprue opening 202 has a coupling means 204 which engages with the coupling means 40 of the nozzle mouthpiece 1. In particular, corresponding to the coupling means 40 of the nozzle mouthpiece 1, the coupling means 204 of the mold sprue opening 202 is an internal thread 208 which is aligned radially and coaxially with the longitudinal axis L. The stop surface 32 of the nozzle mouthpiece 1 rests against a stop surface 206 of the mold sprue opening 202 which radially encompasses the mold sprue opening 202. The nozzle mouthpiece 1 therefore has a defined and substantially fixed position relative to the mold sprue opening 202.

As can be seen, the mold surface 13 of the nozzle mouthpiece 1 on the face side borders a region of the mold cavity 203 in a formative manner. For this purpose, the mold surface 13 of the nozzle mouthpiece 1 finishes flush with a mold cavity wall 207 of the mold cavity 203. Between the coupling means 40 and the outlet opening 12, the nozzle mouthpiece 1 has an external second sealing surface 50 which is aligned radially and coaxially with the longitudinal axis L and borders its mold surface 13. The mold sprue opening 202 in turn has an internal sealing surface 205 which is aligned radially and coaxially with the longitudinal axis L between its coupling means 204 and the mold cavity 203. In doing so, the second sealing surface 50 of the nozzle mouthpiece 1 and the internal sealing surface 205 of the mold sprue opening 202 rest against one another to form a seal.

As can be seen, the nozzle body 101 of the injection molding nozzle 100 is radially encompassed by a sleeve-shaped heating device 112. In addition, the nozzle body 101 is arranged by means of the channel input 103 of the flow channel 102, in particular by means of its nozzle head 107, on a material feeder 120, in particular on a machine nozzle or on a manifold.

Figure 4:
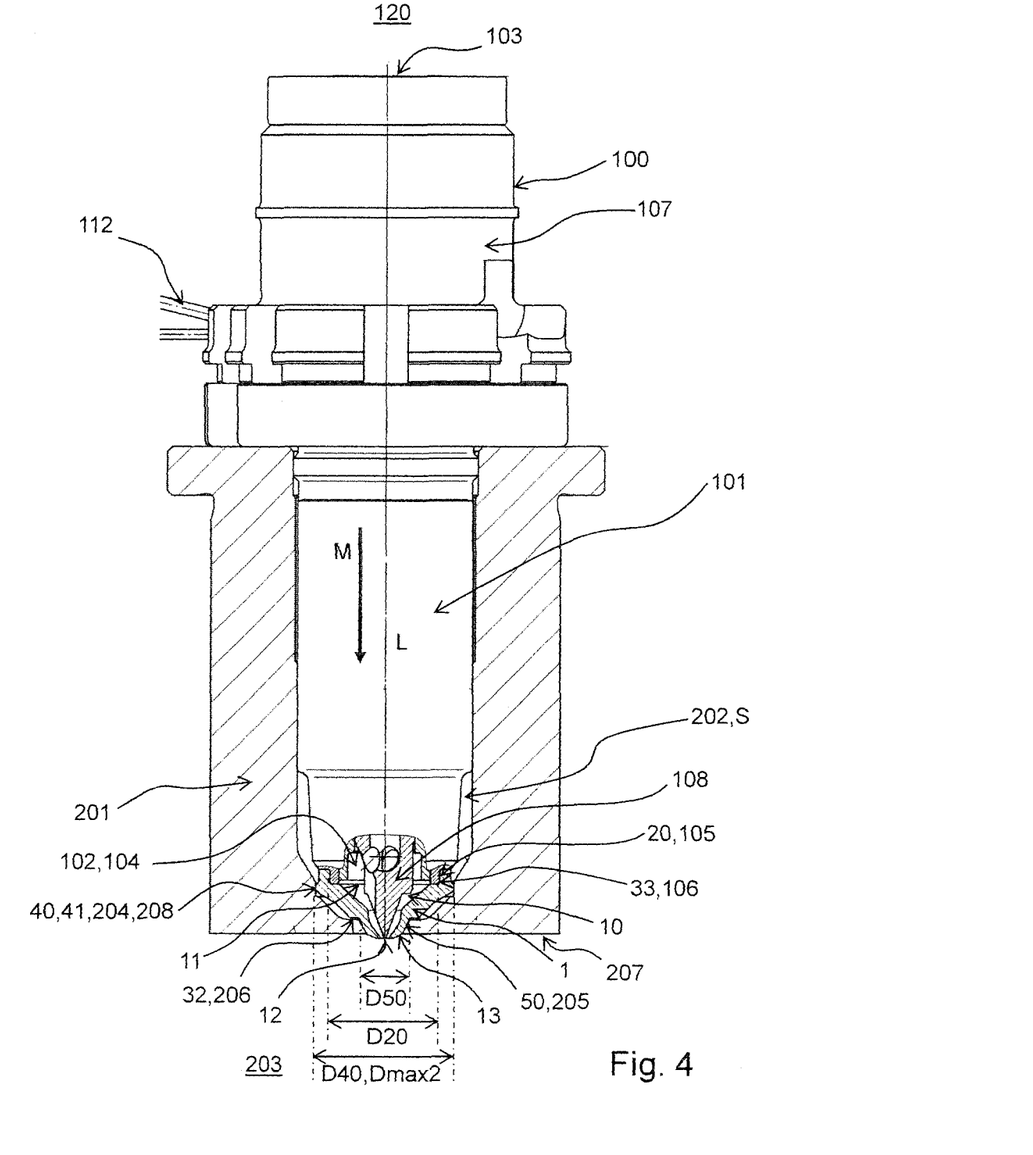
FIG. 4 shows a partial longitudinal section through a section of an injection molding tool comprising an injection molding nozzle with an open nozzle mouthpiece.

A partial longitudinal section through a section of an injection molding tool 200 for processing a fluid mass M comprising an injection molding nozzle 100 with an open nozzle mouthpiece 1 can be seen in FIG. 4.

The nozzle mouthpiece 1 is made of a wear-resistant and highly heat-conducting material. It has a flow channel 10 with an inlet opening 11 and an outlet opening 12. The inlet opening 11 and the outlet opening 12 lie coaxially on a longitudinal axis L. The flow channel 10 is formed so that it widens from the outlet opening 12 towards the inlet opening 11.

A cylindrical first sealing surface 20 with a diameter D20 is formed radially and coaxially with respect to the longitudinal axis L on the nozzle mouthpiece 1. In doing so, the first sealing surface 20 is arranged radially on the inside.

An external stop surface 32, which is aligned perpendicular to the longitudinal axis L and facing the outlet opening 12, is arranged between the first sealing surface 20 and the outlet opening 12. In particular, the stop surface 32 is aligned perpendicular to the longitudinal axis L. A second stop surface 33, which is aligned perpendicular to the longitudinal axis L, is also provided on the inside facing the inlet opening. This is likewise aligned perpendicular to the longitudinal axis L.

The nozzle mouthpiece 1 also includes a coupling means 40 which is arranged radially with respect to the longitudinal axis L for fixing the nozzle mouthpiece 1 in a mold sprue opening 202 of a pattern plate 201. In particular, the coupling means 40 is an external thread 41 which is positioned coaxially with respect to the longitudinal axis L.

An external second sealing surface 50, which is aligned radially and coaxially with the longitudinal axis L and tapers narrowing in the direction of the outlet opening 12, is formed between the coupling means 40 and the outlet opening 12. This enables the second sealing surface 50 to be also used as a radial centering means. The diameter D40 of the coupling means 40 is greater than the diameter D50 of the second sealing surface 50 which is aligned radially with the longitudinal axis L.

The outlet opening 12 of the nozzle mouthpiece 1 is encompassed radially with respect to the longitudinal axis A by a face surface 13 of the mold which borders a region of a mold cavity 203 (position only indicated) in a formative manner in the assembly position shown. In doing so, the mold surface 13 borders the second sealing surface 12 and is spherical in shape. As can be seen, the nozzle mouthpiece 1 forms an open sprue. It has a conical nozzle tip 108 which projects from the direction of the inlet opening 11 to the outlet opening 12.

Furthermore, the injection molding nozzle 100 has a nozzle body 101 in which a flow channel 102 with a channel inlet 103 and a channel outlet 104 for the fluid mass M is formed. The channel inlet 103 and the channel outlet 104 lie coaxially on the longitudinal axis L which corresponds with the longitudinal axis L of the nozzle mouthpiece 1. The flow channel 102 also runs along the longitudinal axis L, in particular coaxially therewith. The channel outlet 104 of the flow channel 102 opens out into the inlet opening 11 of the nozzle mouthpiece 1. In the region of the channel outlet 104, the nozzle body 101 forms a cylindrical and external sealing surface 105 which is aligned radially and coaxially with the longitudinal axis L. The internal first sealing surface 20 of the nozzle mouthpiece 1 is mounted movably in the direction of the longitudinal axis L on the external sealing surface 105 of the nozzle body 101 to form a seal.

The nozzle body 101 also forms a stop surface 106, which is aligned perpendicular to the longitudinal axis L and corresponds with the stop surface 32 of the nozzle mouthpiece 1, on sides of the channel output 104.

As well as the injection molding nozzle 100, the injection molding tool 200 comprises a pattern plate 201 which forms a mold cavity 203 (position only indicated) into which a mold sprue opening 202 opens out. The outlet opening 12 of the nozzle mouthpiece 1 is fed into the mold sprue opening 202. At the same time, the mold sprue opening 202 has a coupling means 204 which engages with the coupling means 40 of the nozzle mouthpiece 1. In particular, corresponding to the coupling means 40 of the nozzle mouthpiece 1, the coupling means 204 of the mold sprue opening 202 is an internal thread 208 which is aligned radially and coaxially with the longitudinal axis L. The stop surface 32 of the nozzle mouthpiece 1 rests against a stop surface 206 of the mold sprue opening 202 which radially encompasses the mold sprue opening 202. The nozzle mouthpiece 1 therefore has a defined and substantially fixed position relative to the mold sprue opening 202.

As can be seen, the mold surface 13 of the nozzle mouthpiece 1 on the face side borders a region of the mold cavity 203 in a formative manner. For this purpose, the mold surface 13 of the nozzle mouthpiece 1 finishes flush with a mold cavity wall 207 of the mold cavity 203 but rises spherically into the mold cavity 203 in the direction of the longitudinal axis L. Between the coupling means 40 and the outlet opening 12, the nozzle mouthpiece 1 has an external second sealing surface 50 which is aligned radially and coaxially with the longitudinal axis L and borders its mold surface 13. The mold sprue opening 202 in turn has an internal sealing surface 205 which is aligned radially and coaxially with the longitudinal axis L between its coupling means 204 and the mold cavity 203. In doing so, the second sealing surface 50 of the nozzle mouthpiece 1 and the internal sealing surface 205 of the mold sprue opening 202 rest against one another to form a seal.

As can be seen, the nozzle body 101 of the injection molding nozzle 100 is radially encompassed by a sleeve-shaped heating device 112 which has electrical connections. In addition, an arrangement of the nozzle body 101 by means of the channel input 103 of the flow channel 102, in particular by means of its nozzle head 107, on a material feeder 120, in particular on a machine nozzle or on a manifold, is indicated.

The invention is not restricted to one of the embodiments described above but can be varied in many ways.

All characteristics and advantages, including design details, spatial arrangements and method steps, arising from the claims, the description and the drawing can be essential to the invention both in their own right and in various combinations.

LIST OF REFERENCES

| | |
|---|---|
| 1 | Nozzle mouthpiece |
| 10 | Flow channel |
| 11 | Inlet opening |
| 12 | Outlet opening |
| 13 | Mold surface |
| 14 | Needle sealing surface |
| 20 | First sealing surface |
| 30 | Flange |
| 31 | Tool mounting |
| 32 | Stop surface |
| 33 | Second stop surface |
| 40 | Coupling means |
| 41 | External thread |
| 50 | Second sealing surface |
| 100 | Injection molding nozzle |
| 101 | Nozzle body |
| 102 | Flow channel |
| 103 | Channel inlet |
| 104 | Channel outlet |
| 105 | Sealing surface |
| 106 | Stop surface |
| 107 | Nozzle head |
| 108 | Nozzle tip |
| 110 | Shut-off needle |
| 111 | Sleeve |
| 112 | Heating device |
| 120 | Material feeder |
| 200 | Injection molding tool |
| 201 | Pattern plate |
| 202 | Mold sprue opening |
| 203 | Mold cavity |
| 204 | Coupling means |
| 205 | Internal sealing surface |
| 206 | Stop surface |
| 207 | Mold cavity wall |
| 208 | Internal thread |
| Dmax1 | Maximum diameter in direction of inlet opening |
| Dmax2 | Maximum diameter in direction of outlet opening |
| D14 | Diameter (needle sealing surface) |
| D20 | Diameter (sealing surface) |
| D30 | Diameter (flange) |
| D40 | Diameter (coupling means) |
| D50 | Diameter (second sealing surface) |
| L | Longitudinal axis |

| | |
|---|---|
| M | Fluid mass |
| S | Air gap |

The invention claimed is:

1. A monolithic nozzle mouthpiece (1) for an injection molding nozzle (100) for use in an injection molding tool (200) and for processing a fluid mass (M), comprising a flow channel (10) having an inlet opening (11) and an outlet opening (12), characterized by
a cylindrical first sealing surface (20) which is formed radially with respect to a longitudinal axis (L) and arranged radially on an outside,
a stop surface (32) which is arranged between the first sealing surface (20) and the outlet opening (12) and which is aligned perpendicular to the longitudinal axis (L) and facing the outlet opening (12), wherein the stop surface (32) is formed by a flange (30) which projects radially with respect to the longitudinal axis (L) beyond the first sealing surface (20),
a coupling means (40) which is arranged radially with respect to the longitudinal axis (L) for fixing the nozzle mouthpiece (1) in a mold sprue opening (202) of a pattern plate (201), wherein the coupling means (40) is an external thread (41) or a bayonet connector and arranged between the stop surface (32) and the outlet opening (12), and
an external sealing surface (50), which is aligned radially with the longitudinal axis (L), is formed between the coupling means (40) and the outlet opening (12).

2. An injection molding nozzle (100) for use in an injection molding tool (200) and for processing a fluid mass (M),
having a nozzle body (101) in which at least one flow channel (102) with a channel inlet (103) and a channel outlet (104) for the fluid mass (M) is formed,
wherein the channel outlet (104) of the flow channel (102) opens out into an inlet opening (11) of a monolithic nozzle mouthpiece (1), the monolithic nozzle mouthpiece (1) being configured for an injection molding nozzle (100) for use in an injection molding tool (200) and for processing a fluid mass (M), comprising
a flow channel (10) connecting the inlet opening (11) and an outlet opening (12),
a cylindrical first sealing surface (20) which is formed radially with respect to a longitudinal axis (L),
a stop surface (32) which is arranged between the first sealing surface (20) and the outlet opening (12) and which is aligned perpendicular to the longitudinal axis (L) and facing the outlet opening (12), wherein the stop surface (32) is formed by a flange (30) which projects radially with respect to the longitudinal axis (L) beyond the first sealing surface (20), and
a coupling means (40) which is arranged radially with respect to the longitudinal axis (L) for fixing the nozzle mouthpiece (1) in a mold sprue opening (202) of a pattern plate (201),
wherein the nozzle body (101) forms a cylindrical sealing surface (105) which is aligned radially with the longitudinal axis (L) in the region of the channel outlet (104), and
wherein the first sealing surface (20) of the nozzle mouthpiece (1) is mounted movably and with the ability to telescope in the direction of the longitudinal axis (L) on the sealing surface (105) of the nozzle body (101) to form a seal.

3. The injection molding nozzle (100) as claimed in claim 2, characterized in that the coupling means (40) of the nozzle mouthpiece (1) is an external thread (41) or a bayonet connector.

4. The injection molding nozzle (100) as claimed in claim 2, characterized in that the nozzle mouthpiece (1) is made of a wear-resistant material.

5. The injection molding nozzle (100) as claimed in claim 2, characterized in that the nozzle mouthpiece (1) comprises an external second sealing surface (50), which is aligned radially with the longitudinal axis (L), is formed between the coupling means (40) and the outlet opening (12).

6. The injection molding nozzle (100) as claimed in claim 2, characterized in that the outlet opening (12) of the nozzle mouthpiece (1) is encompassed radially with respect to the longitudinal axis (A) by a face surface (13) of the mold which borders a region of a mold cavity (203) in a formative manner in an assembly position.

7. The injection molding nozzle (100) as claimed in claim 2, characterized in that the nozzle mouthpiece (1) comprises a needle sealing surface (14) for a shut-off needle (110), which is aligned radially with the longitudinal axis (L), is formed in the flow channel (10).

8. The injection molding nozzle (100) as claimed in claim 2, characterized in that the nozzle mouthpiece (1) forms an open sprue.

9. An injection molding nozzle (200) for processing a fluid mass (M), having
an injection molding nozzle (100) as claimed in claim 2, and
a pattern plate (201) which forms a mold cavity (203) into which a mold sprue opening (202) opens out,
wherein the outlet opening (12) of the nozzle mouthpiece (1) is fed into the mold sprue opening (202), and
wherein the mold sprue opening (202) has a coupling means (204) which engages with the coupling means (40) of the nozzle mouthpiece (1) and the nozzle mouthpiece (1) being fixed in a defined position relative to the pattern plate (201) in the region of the sprue opening (202) in all operating states of the injection molding tool (200), and
wherein the stop surface (32) of the nozzle mouthpiece (1) rests against a stop surface (206) of the mold sprue opening (202) which radially encompasses the mold sprue opening (202).

10. The injection molding tool (200) as claimed in claim 9, characterized in that the outlet opening (12) of the nozzle mouthpiece (1) is encompassed radially with respect to the longitudinal axis (A) by a face surface (13) of the mold which borders a region of the mold cavity (203) in a formative manner.

11. The injection molding tool (200) as claimed in claim 9, characterized in that the stop surface (32) of the nozzle mouthpiece (1) rests against a stop surface (206) of the mold sprue opening (202) which radially encompasses the mold sprue opening (202).

12. The injection molding tool (200) as claimed in claim 9, characterized in that the nozzle mouthpiece (1) has an external second sealing surface (50) which is aligned radially with the longitudinal axis (L) between the coupling means (40) and the outlet opening (12), and that the mold sprue opening (202) has an internal sealing surface (205) which is aligned radially with the longitudinal axis (L) between its coupling means (204) and the mold cavity (203), wherein the second sealing surface (50) of the nozzle mouthpiece (1) and the internal sealing surface (205) of the mold sprue opening (202) rest against one another to form a seal.

13. A monolithic nozzle mouthpiece (1) for an injection molding nozzle (100) for use in an injection molding tool (200) and for processing a fluid mass (M), comprising a flow channel (10) having an inlet opening (11) and an outlet opening (12), characterized by
- a cylindrical first sealing surface (20) which is formed radially with respect to a longitudinal axis (L) and arranged radially on an inside,
- a stop surface (32) which is arranged between the first sealing surface (20) and the outlet opening (12) and which is aligned perpendicular to the longitudinal axis (L) and facing the outlet opening (12), and
- a coupling means (40) which is arranged radially with respect to the longitudinal axis (L) for fixing the nozzle mouthpiece (1) in a mold sprue opening (202) of a pattern plate (201), wherein the coupling means (40) is an external thread (41) or a bayonet connector and arranged between the stop surface (32) and the cylindrical first sealing surface (20), and
- an external sealing surface (50), which is aligned radially with the longitudinal axis (L), is formed between the coupling means (40) and the outlet opening (12) and is formed between the stop surface (32) and the outlet opening (12).

* * * * *